(12) United States Patent
Yamakawa et al.

(10) Patent No.: US 10,103,664 B2
(45) Date of Patent: Oct. 16, 2018

(54) VEHICLE CONTROL APPARATUS

(71) Applicant: TOYOTA JIDOSHA KABUSHIKI KAISHA, Toyota-shi, Aichi-ken (JP)

(72) Inventors: Toshifumi Yamakawa, Okazaki (JP); Shintaro Tsujii, Chiryu (JP); Masaki Okamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/720,638

(22) Filed: Sep. 29, 2017

(65) Prior Publication Data

US 2018/0097464 A1  Apr. 5, 2018

(30) Foreign Application Priority Data

Oct. 3, 2016  (JP) .................. 2016-195829

(51) Int. Cl.
 *G05B 11/28* (2006.01)
 *H02P 9/04* (2006.01)
 *H02P 29/64* (2016.01)

(52) U.S. Cl.
 CPC ............. *H02P 9/04* (2013.01); *H02P 29/64* (2016.02)

(58) Field of Classification Search
 CPC ...... H02P 1/00; H02P 3/00; H02P 6/00; H02P 1/46; H02P 3/18; H02P 27/04; H02P 27/06; H02P 41/00; H02P 21/00; H02P 23/00; H02P 27/00; G05B 11/28
 USPC ...... 318/599, 811, 400.01, 400.02, 700, 701, 318/727, 779, 799, 800, 801, 721; 361/23, 24, 27, 30, 25, 37; 363/21.1, 40, 363/44, 95, 120, 174, 175; 388/800, 819, 388/821; 324/623
 See application file for complete search history.

(56) References Cited

U.S. PATENT DOCUMENTS

| 7,151,354 | B2 * | 12/2006 | Yoshinaga | ............... H02J 3/01 318/611 |
| 9,479,106 | B2 * | 10/2016 | Nakai | ................. H02P 29/0038 |
| 2010/0185350 | A1 | 7/2010 | Okamura et al. | |

FOREIGN PATENT DOCUMENTS

| JP | 2009-171768 A | 7/2009 |
| JP | 2016-054594 A | 4/2016 |

* cited by examiner

*Primary Examiner* — Antony M Paul
(74) *Attorney, Agent, or Firm* — Hunton Andrews Kurth LLP

(57) ABSTRACT

A vehicle control apparatus is provided with: a modulator configured to generate modulation signals; a first corrector configured to perform a first correction process in which a center value of the modulation signals is corrected to reduce a loss in the inverter; a second corrector configured to perform a second correction process in which an amplitude shift and a phase shift of the third harmonic signal with respect to the voltage command signals are reduced; and a controller configured (i) to control the first corrector to perform the first correction process if the DC voltage is greater than or equal to first predetermined voltage and (ii) to control the second corrector to perform the second correction process if the DC voltage is less than the first predetermined voltage, when a number of revolutions of the AC motor is less than a predetermined number of revolutions.

4 Claims, 13 Drawing Sheets

VEHICLE CONTROL APPARATUS

CROSS-REFERENCE TO RELATED APPLICATIONS

This application is based upon and claims the benefit of priority of the prior Japanese Patent Application No. 2016-195829, filed on Oct. 3, 2016, the entire contents of which are incorporated herein by reference.

BACKGROUND OF THE INVENTION

1. Field of the Invention

Embodiments of the present invention relate to a vehicle control apparatus configured to control a vehicle equipped with an electric motor.

2. Description of the Related Art

One example of a control method for driving a three-phase alternating current (AC) motor is pulse width modulation (PWM) control. In the PWM control, a power converter is controlled in accordance with a magnitude relation between phase voltage command signals, which are set from a viewpoint of matching phase current supplied to the three-phase AC motor with a predetermined value, and a carrier signal of a predetermined frequency.

When the three-phase AC motor is driven, a ripple in direct current (DC) voltage inputted to the power converter (i.e. a so-called pulsating component) increases in some cases. For a method of reducing the ripple, for example, in Japanese Patent Application Laid Open No. 2009-171768, there is proposed a technique/technology in which a third harmonic signal is superimposed on the phase voltage command signals and in which correction is performed to reduce an amplitude shift and a phase shift of the third harmonic signal.

On the other hand, when the three-phase AC motor is driven and has an extremely low number of revolutions, heating of switching elements of the power converter increases in some cases, which may cause failure. For a method of reducing the heating of the switching elements, for example, in Japanese Patent Application Laid Open No. 2016-054594, there is proposed a technique/technology in which a center value of the phase voltage command signals is offset-corrected to reduce losses of the switching elements.

The present inventors' studies show that the ripple generated on the DC voltage side of the power converter increases if the correction described in Japanese Patent Application Laid Open No. 2016-054594 (i.e. the offset of the center value of the phase voltage command signals) is performed. This is because shifting of the phase voltage command signals causes an extension in a zero vector period in which all the switching elements in three phases are off.

In order to reduce the ripple that has increased, it is also possible to adopt the correction described in Japanese Patent Application Laid Open No. 2009-171768 (i.e. the correction for the amplitude shift and the phase shift of the third harmonic signal); however, a sufficient correction effect cannot be obtained while the center value of the signals is offset, and the ripple cannot be reduced. In other words, the ripple that has increased due to the offset of the center value of the signals cannot be reduced by the correction for the amplitude shift and the phase shift of the third harmonic signal.

As a result, if the ripple in the DC voltage increases due to the offset of the center value of the phase voltage command signals, it is hard to reduce the ripple, resulting in malfunction, such as, for example, overpressurization and unstable motor control, which is technically problematic.

SUMMARY

The aforementioned problem is one example of problems to be solved by embodiments of the present invention. In view of the aforementioned problem, it is therefore an object of embodiments of the present invention to provide a vehicle control apparatus configured to control an AC motor, which is a power source of the vehicle.

<1>

A first vehicle control apparatus according to embodiments of the present invention is a vehicle control apparatus configured to control a vehicle, which includes an alternating current (AC) motor as a power source and an inverter configured to convert direct current (DC) voltage to AC voltage and supply the AC voltage to the AC motor, said vehicle control apparatus comprising: a modulator configured to generate modulation signals by superimposing a third harmonic signal on voltage command signals for controlling voltage of the inverter; a first corrector configured to perform a first correction process in which a center value of the modulation signals is corrected to reduce a loss in the inverter; a second corrector configured to perform a second correction process in which an amplitude shift and a phase shift of the third harmonic signal with respect to the voltage command signals are reduced if a modulation factor of each of the modulation signals is greater than or equal to a predetermined value; and a controller configured (i) to control said first corrector to perform the first correction process if the DC voltage is greater than or equal to first predetermined voltage and (ii) to control said second corrector to perform the second correction process if the DC voltage is less than the first predetermined voltage, when a number of revolutions of the AC motor is less than a predetermined number of revolutions.

According to the first vehicle control apparatus in embodiments of the present invention, when the number of revolutions of the AC motor is less than the predetermined number of revolutions, the first correction process (i.e. the process of correcting the center value of the modulation signals) or the second correction process (i.e. the process of correcting the amplitude shift and the phase shift of the third harmonic signal) is selectively performed in accordance with the DC voltage of the inverter. The first correction process has an effect of suppressing the heating of the inverter, but also has a risk of increasing a ripple generated in the DC voltage. The second correction process has an effect of suppressing the ripple generated in the DC voltage, but may not be able to suppress the ripple while the first correction process is performed.

Here, in particular, while the AC motor has an extremely low number of revolutions and the DC voltage is relatively high, the heating of the inverter is easily generated, and the ripple in the DC voltage is hardly generated. It is thus possible to suppress the ripple caused by the first correction process while effectively suppressing the heating of the inverter by performing the first correction process if the DC voltage is greater than or equal to the first predetermined voltage. In contrast, while the AC motor has an extremely low number of revolutions and the DC voltage is relatively low, the heating of the inverter is hardly generated, and the ripple in the DC voltage is easily generated. Thus, the generation of the ripple can be effectively suppressed by performing the second correction process if the DC voltage is less than the first predetermined voltage.

<2>

In one aspect of the first vehicle control apparatus in embodiments of the present invention, wherein said controller is configured to control the said first corrector to perform the first correction process regardless of whether or not the DC voltage is greater than or equal to the first predetermined voltage, if temperature of coolant of the inverter or temperature of elements included in the inverter is greater than or equal to first predetermined temperature.

According to this aspect, if the temperature of the coolant of the inverter or the temperature of the elements included in the inverter is greater than or equal to the first predetermined temperature, the first correction process having the effect of suppressing the heating of the inverter is preferentially performed regardless of the magnitude of the DC voltage. It is thus possible to avoid the failure caused by the heating of the inverter, or the like.

<3>

A second vehicle control apparatus according to embodiments of the present invention is a vehicle control apparatus configured to control a vehicle, which includes an alternating current (AC) motor as a power source and an inverter configured to convert direct current (DC) voltage to AC voltage and supply the AC voltage to the AC motor, said vehicle control apparatus comprising: a modulator configured to generate modulation signals by superimposing a third harmonic signal on voltage command signals for controlling voltage of the inverter; a first corrector configured to perform a first correction process in which a center value of the modulation signals is corrected to reduce a loss in the inverter; a second corrector configured to perform a second correction process in which an amplitude shift and a phase shift of the third harmonic signal with respect to the voltage command signals are reduced if a modulation factor of each of the modulation signals is greater than or equal to a predetermined value; and a controller configured (i) to control said first corrector to perform the first correction process if temperature of coolant of the inverter or temperature of elements included in the inverter is greater than or equal to second predetermined temperature and (ii) to control said second corrector to perform the second correction process if the temperature of the coolant of the inverter or the temperature of the elements included in the inverter is less than the second predetermined temperature, when a number of revolutions of the AC motor is less than a predetermined number of revolutions.

According to the second vehicle control apparatus in embodiments of the present invention, when the number of revolutions of the AC motor is less than the predetermined number of revolutions, the first correction process or the second correction process is selectively performed in accordance with the temperature of the coolant of the inverter or the temperature of the elements included in the inverter.

Here, in particular, if the temperature of the inverter is high, for example, the elements included in the inverter may malfunction and may not be able to perform normal operation. It is thus possible to certainly suppress the heating of the inverter by performing the first correction process if the temperature of the coolant of the inverter or the temperature of the elements included in the inverter is greater than or equal to the second predetermined temperature. In contrast, if the temperature of the inverter is low, there is a low possibility of the failure of the inverter, and there is not much merit in performing the first correction process. Thus, the generation of the ripple in the DC voltage can be suppressed by performing the second correction process if the temperature of the coolant of the inverter or the temperature of the elements included in the inverter is less than the second predetermined temperature.

<4>

In one aspect of the second vehicle control apparatus in embodiments of the present invention, wherein said controller is configured to control the said first corrector to perform the first correction process while the DC voltage is maintained to be greater than or equal to second predetermined voltage, if the temperature of the coolant of the inverter or the temperature of the elements included in the inverter is greater than or equal to the second predetermined temperature.

According to this aspect, the first correction process is performed while the DC voltage is maintained to be greater than or equal to the second predetermined voltage. It is thus possible to suppress the generation of the ripple in the DC voltage.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Hereinafter, vehicle control apparatuses according to embodiments will be explained.

First Embodiment

A vehicle control apparatus according to a first embodiment will be explained with reference to FIG. 1 to FIG. 11.

<Configuration of Vehicle>

Figure 1:
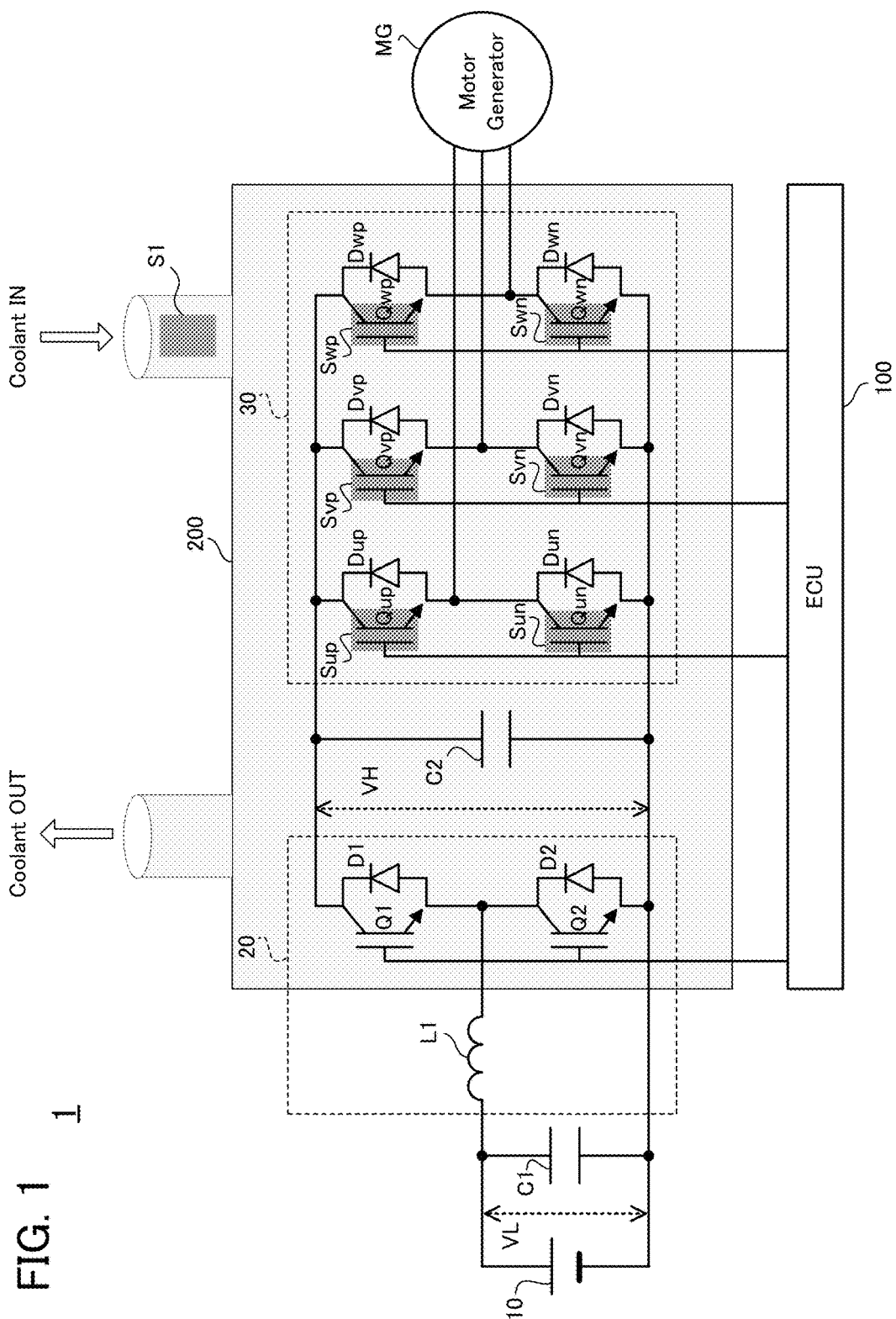
FIG. 1 is a block diagram illustrating a configuration of a vehicle.

Firstly, with reference to FIG. 1, a configuration of a vehicle on which the vehicle control apparatus is mounted will be explained. FIG. 1 is a block diagram illustrating the configuration of the vehicle.

As illustrated in FIG. 1, a vehicle 1, which is an electric vehicle, is provided with a DC power supply 10, a smoothing capacitor C1, a converter 20, a smoothing capacitor C2, an inverter 30, an electronic control unit (ECU) 100, a cooler 200, and a motor generator MG.

The DC power supply 10 is a chargeable power storage apparatus. One example of the DC power supply 10 is, for example, a secondary battery (e.g. a nickel hydrogen battery or a lithium ion secondary battery) and a capacitor (e.g. an electric double layer capacitor or a large capacitance capacitor).

The smoothing capacitor C1 is a capacitor for voltage smoothing and is connected between a positive line of the DC power supply 10 and a negative line of the DC power supply 10. The smoothing capacitor C1 is a capacitor configured to smooth variation of inter-terminal voltage VL between the positive line and the negative line.

The converter 20 is provided with a reactor L1, a switching element Q1 connected to a rectifier diode D1, and a switching element Q2 connected to a rectifier diode D2. In the converter 20, the switching elements Q1 and Q2 are controlled to be turned on and off in a complementary and alternate manner in each switching period.

The converter 20 is configured to increase the DC voltage VL, which is supplied from the DC power supply 10, to DC voltage VH in a boost or step-up operation. The DC voltage VH corresponding to input voltage inputted to the inverter 30 will be also hereinafter referred to as "system voltage". The boost operation is performed by supplying electromagnetic energy stored in the reactor L1 in an ON period of the switching element Q2, via the switching element Q1 and the rectifier diode D1.

Moreover, the converter 20 is configured to reduce the DC voltage VH to the DC voltage VL in a buck or step-down operation. The buck operation is performed by supplying electromagnetic energy stored in the reactor L1 in an ON period of the switching element Q1, via the switching element Q2 and the rectifier diode D2.

Moreover, a voltage conversion ratio in the boost operation and the buck operation (i.e. a ratio of VH and VL) is controlled by an ON period ratio of the switching elements Q1 and Q2 in the switching period (i.e. a duty ratio). If the switching elements Q1 and Q2 are respectively fixed to be on and off, VH=VL (voltage conversion ratio=1.0) can be also established.

The smoothing capacitor C2 is a capacitor for voltage smoothing and is connected between the converter 20 and the inverter 30. The smoothing capacitor C2 is a capacitor configured to smooth variation of the system voltage VH.

The inverter 30 is configured to convert DC power (or DC voltage) supplied from the converter 20, to AC power (or three-phase AC voltage). In order to convert the DC power to the AC power, the inverter 30 is provided with: a U-phase arm including a p-side switching element Qup and an n-side switching element Qun; a V-phase arm including a p-side switching element Qvp and an n-side switching element Qvn; and a W-phase arm including a p-side switching element Qwp and an n-side switching element Qwn. The arms of the inverter 30 are connected in parallel between the positive line and the negative line. Rectifier diodes Dup, Dvp, and Dwp are respectively connected to the p-side switching elements Qup, Qvp, and Qwp. In the same manner, rectifier diodes Dun, Dvn, and Dwn are respectively connected to the n-side switching elements Qun, Qvn, and Qwn. In each of the switching elements Qup to Qwn of the inverter 30, switching on and off is controlled by pulse width modulation (PWM) control.

The p-side switching elements Qup, Qvp, and Qwp and the n-side switching elements Qun, Qvn, and Qwn are respectively provided with element temperature sensors Sup, Svp, Swp, Sun, Svn, and Swn configured to detect temperature of respective switching elements. The temperature of the switching elements detected respectively by the element temperature sensors Sup to Swn is configured to be outputted to the ECU 100.

Midpoints of upper arms (i.e. the p-side switching elements) and lower arms (i.e. the respective n-side switching elements) of the three phase arms in the inverter 30 are connected to respective three phase coils of the motor generator MG. As a result, AC power (or three-phase AC voltage) generated as a result of the conversion operation by the inverter 30 is supplied to the motor generator MG.

The motor generator MG is one specific example of the "AC motor", and is configured as a three-phase AC motor generator. The motor generator MG is configured to be driven to generate torque required for the vehicle 1 to travel. The torque generated by the motor generator MG is transmitted to drive wheels via a drive shaft mechanically coupled with a rotating shaft of the motor generator MG. The motor generator MG may perform power regeneration (or power generation) when the vehicle 1 brakes or in similar cases.

The ECU 100 is an electronic control unit configured to control operation of the vehicle 1. The ECU 100 according to the embodiment is one specific example of the "vehicle control apparatus", and is configured to perform an inverter control operation for controlling operation of the inverter 30. A specific configuration of the ECU 100 and the control operation of the inverter 30 will be detailed later.

The cooler 200 is a cooling apparatus of a water cooling type, and is configured to accommodate therein the switching elements Q1 and Q2 of the converter 20, the smoothing capacitor C2, and the switching elements of the inverter 30. The cooler 200 is configured to prevent failure caused by heating of the elements accommodated therein, by using coolant. In a part of the cooler in which the coolant is introduced, a coolant temperature sensor S1 configured to detect the temperature of the coolant is provided. The temperature of the coolant detected by the coolant temperature sensor S1 is configured to be outputted to the ECU 100.

<Configuration of ECU>

Figure 2:
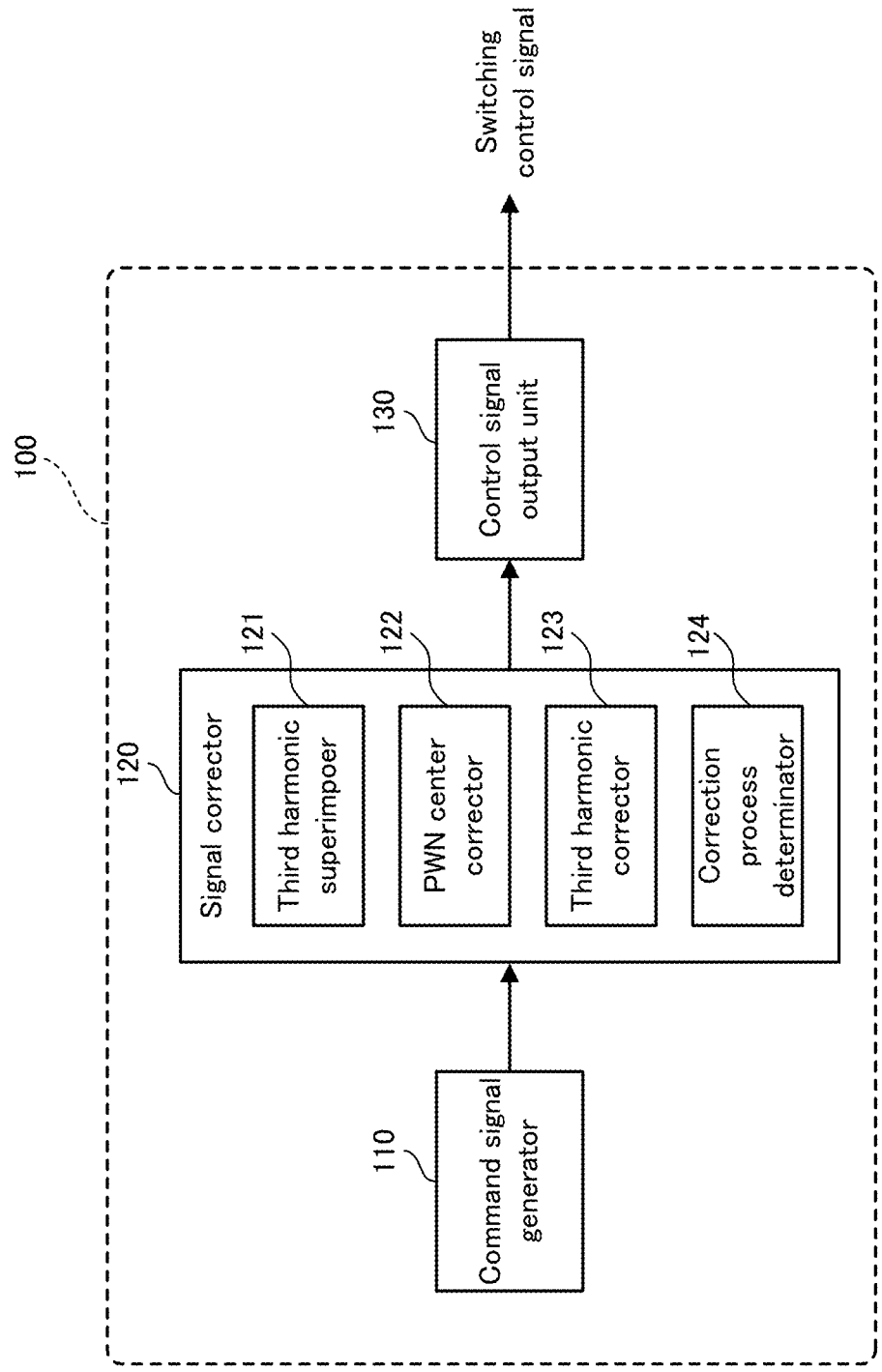
FIG. 2 is a block diagram illustrating a configuration of an ECU (and particularly, a configuration for controlling operation of an inverter)

Next, with reference to FIG. 2, a configuration of the ECU 100 (and particularly, a configuration for controlling the operation of the inverter 30) will be explained. FIG. 2 is a block diagram illustrating the configuration of the ECU 100 (and particularly, the configuration for controlling the operation of the inverter 30).

As illustrate in FIG. 2, the ECU 100 is provided with a command signal generator 110, a signal corrector 120, and a control signal output unit 130, which are logical or physical processing blocks realized inside the ECU 100. The signal corrector 120 is provided with a third harmonic superimposer 121, a PWM center corrector 122, a third harmonic corrector 123, and a correction process determinator 124.

The command signal generator 110 is configured to generate three-phase voltage command signals (i.e. a U-phase voltage command signal Vu, a V-phase voltage command signal Vv, and a W-phase voltage command signal Vw) in accordance with driving force required for the motor generator MG. The three-phase voltage command signals generated on the command signal generator 110 are configured to be outputted to the signal corrector 120.

The signal corrector 120 is configured to perform a predetermined correction process on the three-phase voltage command signals generated on the command signal generator 110 and to then output them to the control signal output unit 130.

The third harmonic superimposer 121 is one specific example of the "modulator", and is configured to add a third harmonic signal Vh to the three-phase voltage command signals, thereby generating three-phase modulation signals (hereinafter simply referred to as "modulation signals"). Specifically, the third harmonic superimposer 121 is configured to add the third harmonic signal Vh to the U-phase voltage command signal Vu, thereby generating a U-phase modulation signal Vmu (=Vu+Vh). In the same manner, the third harmonic superimposer 121 is configured to generate a V-phase modulation signal Vmv (=Vv+Vh) and a W-phase modulation signal Vmw (=Vw+Vh).

The PWM center corrector 122 is one specific example of the "first corrector", and is configured to perform a PWM center correction process on the three-phase modulation signals generated on the third harmonic superimposer 121 (i.e. the U-phase modulation signal Vmu, the V-phase modulation signal Vmv, and the W-phase modulation signal Vmw). Specific process content of the PWM center correction process and effect thereof will be detailed later. The PWM center correction process is one specific example of the "first correction process".

The third harmonic corrector 123 is one specific example of the "second corrector", and is configured to correct the third harmonic signal Vh added on the third harmonic superimposer 121 (hereinafter referred as a "third harmonic correction process). Specific process content of the third harmonic correction process and effect thereof will be detailed later. The third harmonic correction process is one specific example of the "second correction process".

The correction process determinator 124 is one specific example of the "controller", and is configured to select the PWM center correction process by the PWM center corrector 122 or the third harmonic correction process by the third harmonic corrector 123 in accordance with a predetermined condition. In other words, the PWM center correction process and the third harmonic correction process are not performed at the same time, and one of them is performed depending on circumstances.

The control signal output unit 130 is configured to generate PWM signals for controlling switching of the switching elements Qup to Qwn of the inverter 30 and to output them to the inverter 30, on the basis of the signals outputted from the signal corrector 120 (i.e. the three-phase modulation signals on which the PWM center correction process or the third harmonic correction process is performed). Specifically, the control signal output unit 130 is configured to generate U-phase PWM signals Gup and Gun, V-phase PWM signals Gyp and Gvn, and W-phase PWM signals Gwp and Gwn and to output them, on the basis of a magnitude relation between the corrected three-phase modulation signals and a carrier signal CR.

<PWM Center Correction Process>

Figure 3:
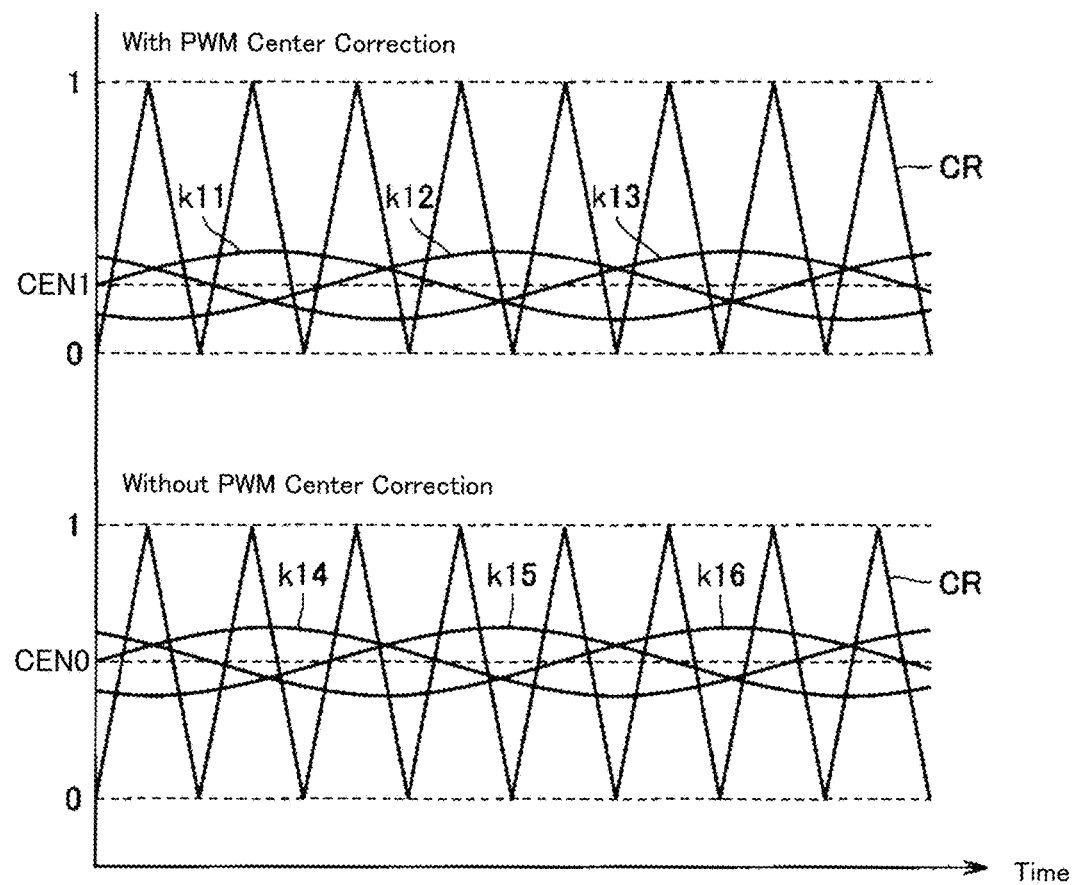
FIG. 3 is a time chart illustrating one example of PWM center correction.

Next, with reference to FIG. 3, the PWM center correction process will be explained. FIG. 3 is a time chart illustrating one example of the PWM center correction. A detailed principle or the like of the PWM center correction will be omitted here, because the PWM center correction process is an existing technique/technology.

As illustrated in FIG. 3, in general PWM control (i.e. in control in which the PWM center correction process is not performed), the three-phase modulation signals (i.e. the U-phase modulation signal Vmu, the V-phase modulation signal Vmv, and the W-phase modulation signal Vmw) are generated in such a manner that a center value of the three-phase modulation signals (hereinafter referred to as a "PWM center" as occasion demands) is a center value (CEN0) of the carrier signal CR.

In contrast, in the PWM center correction process, the PWM center is corrected by using a correction value ΔCEN, which is determined on the basis of, for example, frequency of the carrier signal and motor current. Specifically, in the PWM center correction process, the correction value ΔCEN is added to the three-phase modulation signals, by which the three-phase modulation signals are offset.

In FIG. 3, curves k11 to k13 indicate the three-phase modulation signals when the PWM center correction process is performed, and curves k14 to k16 indicate the three-phase modulation signals when the PWM center correction process is not performed. In the curves k11 to k13 indicating the three-phase modulation signals when the PWM center correction process is performed, the PWM center is changed to CEN1, which is less than CEN0, due to the addition of the correction value ΔCEN.

The PWM signals are generated in such a manner that the p-side switching elements are on and the n-side switching elements are off when the three-phase modulation signals are greater than the carrier signal CR. Thus, if the PWM center is changed to be reduced, a time length in which the p-side switching element in each phases is on is reduced, in comparison with when the PWM center is not changed. As a result, on losses of the p-side switching elements are reduced. Therefore, according to the PWM center correction process, it is possible to suppress concentration of current flow into a particular switching element or a particular phase, and it is possible to prevent failure in the switching elements caused by the heating.

<Third Harmonic Correction Process>

Figure 4:
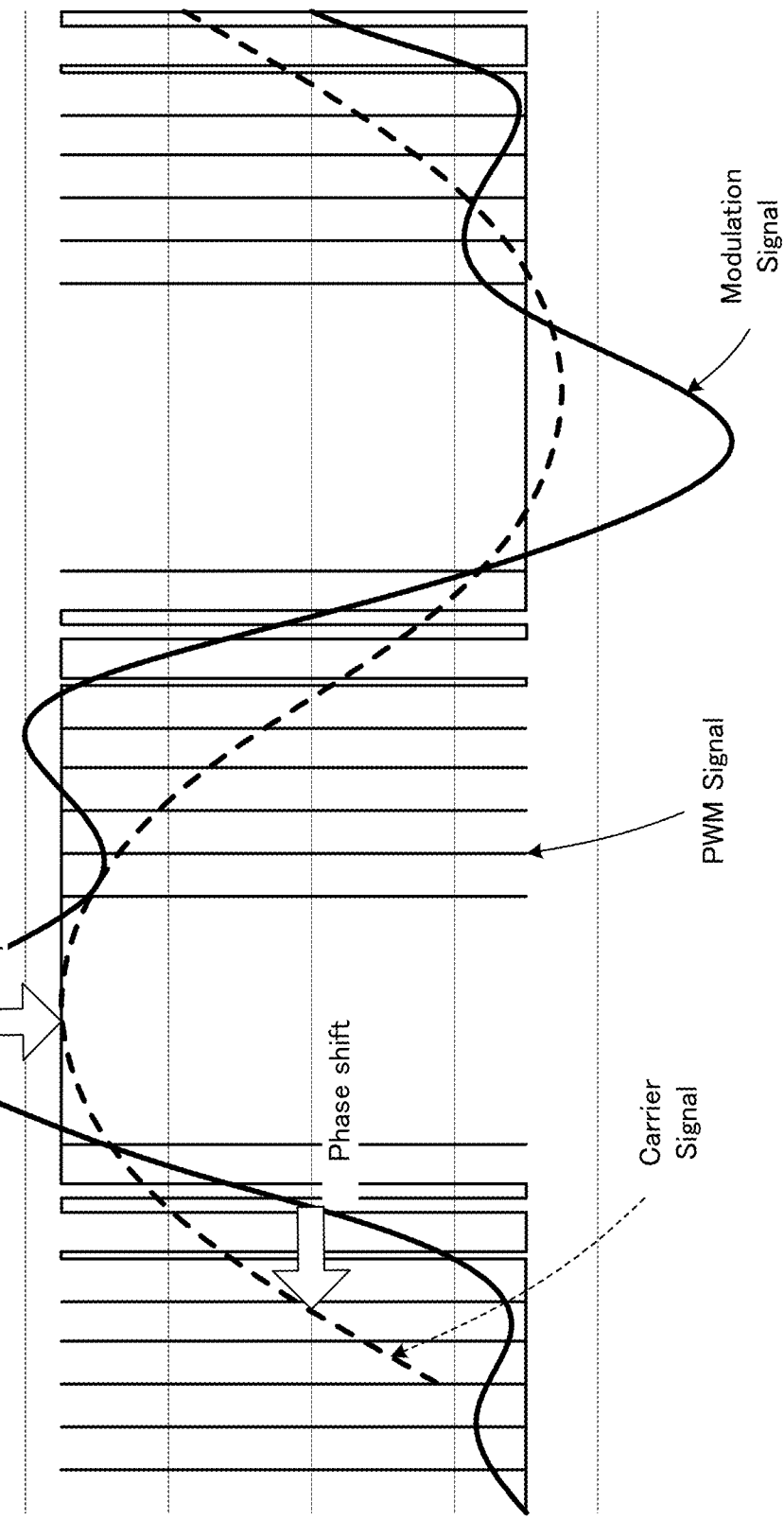
FIG. 4 is a time chart illustrating an amplitude shift and a phase shift of a voltage command in an overmodulation area.

Next, with reference to FIG. 4, the third harmonic correction process will be explained. FIG. 4 is a time chart illustrating an amplitude shift and a phase shift of a voltage command in an overmodulation area. A detailed principle or the like of the third harmonic correction process will be omitted here, because the third harmonic correction process is an existing technique/technology.

As illustrated in FIG. 4, in control in which the third harmonic signal Vh is superimposed on each of the three-phase voltage command signals, the amplitude shift and the phase shift of respective one of the modulation signals with respect to the carrier signal CR occur in the overmodulation area. Such shifts occur because the third harmonic signals Vh with different amplitudes and different phases are superimposed on the respective three-phase voltage command signals. Thus, in the third harmonic correction process, the aforementioned shifts are reduced by correcting the amplitude and the phase of the third harmonic signal Vh.

In the third harmonic correction process, it is firstly determined whether or not a modulation factor of each modulation signal is greater than or equal to a predetermined value. The "predetermined value" is set in advance as a threshold value for determining whether or not the relevant modulation signal is in the overmodulation area. The "predetermined value" can be determined, for example, on the basis of the amplitude and the phase of the third harmonic signal Vh to superimpose.

If it is determined that the modulation factor is greater than or equal to the predetermined value, the amplitude and the phase of the third harmonic signal Vh are corrected. A correction value (i.e. an addition value) of the phase can use, for example, a phase difference obtained by performing fast Fourier Transform (FFT) on a switching pattern. Alternatively, the correction value may also use a value determined in advance by experiments and simulations or the like. According to the third harmonic correction process, the amplitude shift and phase shift of the modulation signal caused by the superimposition of the third harmonic signal can be suppressed, by which voltage output as commanded can be realized.

<Problems Caused by Correction Process>

Figure 5:
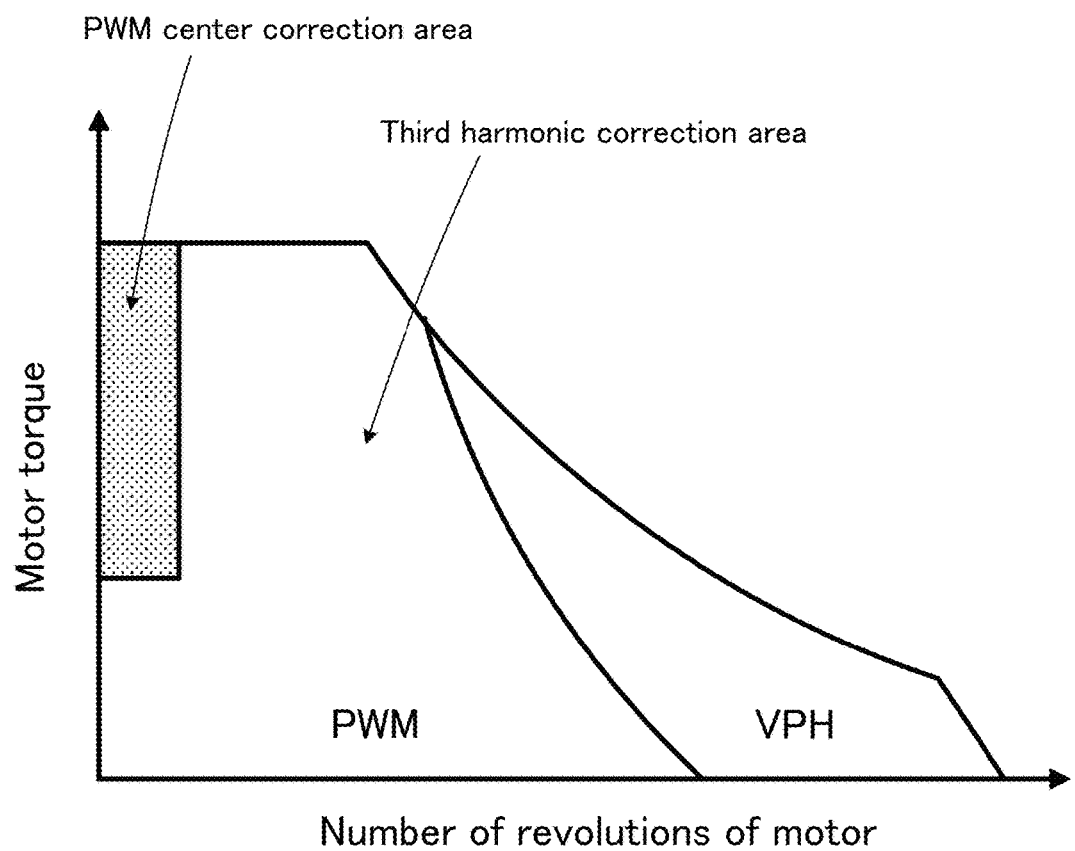
FIG. 5 is a map illustrating one example of an area in which the PMW center correction and third harmonic correction are performed.
Figure 6:
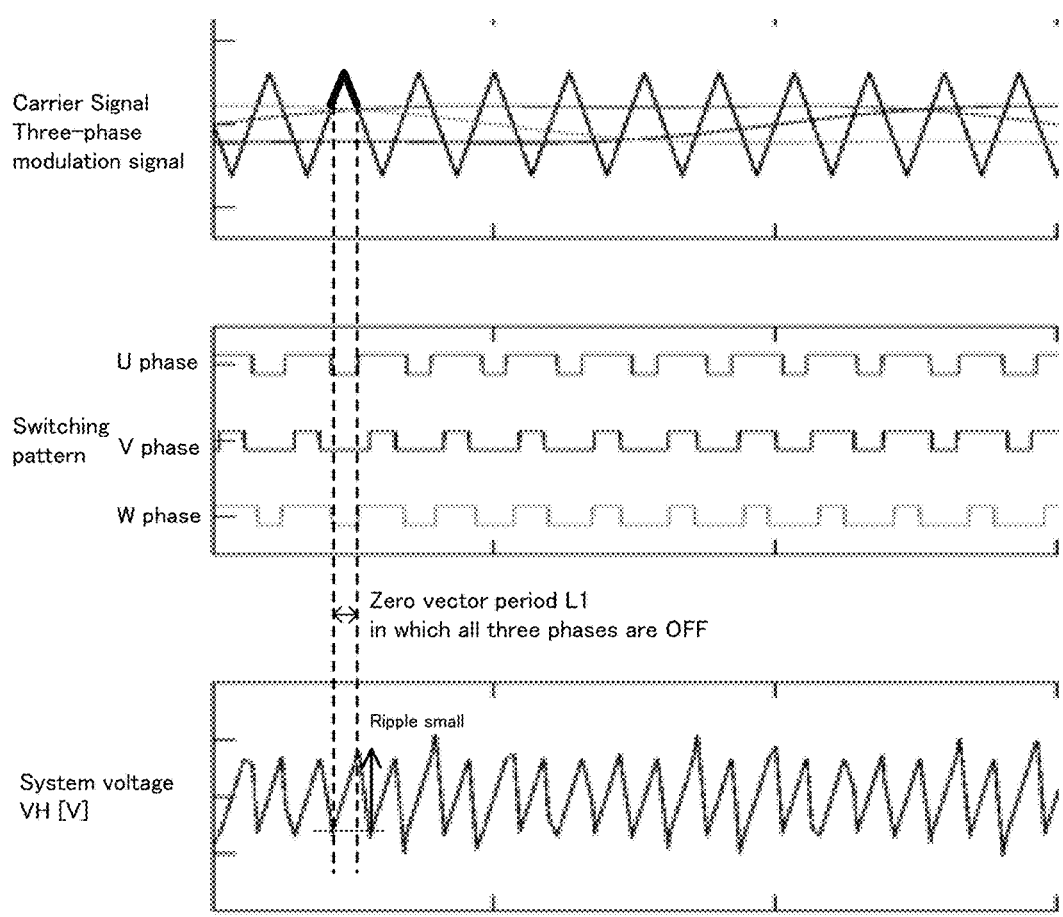
FIG. 6 is a time chart illustrating various parameters of an inverter before the PWM center correction.
Figure 7:
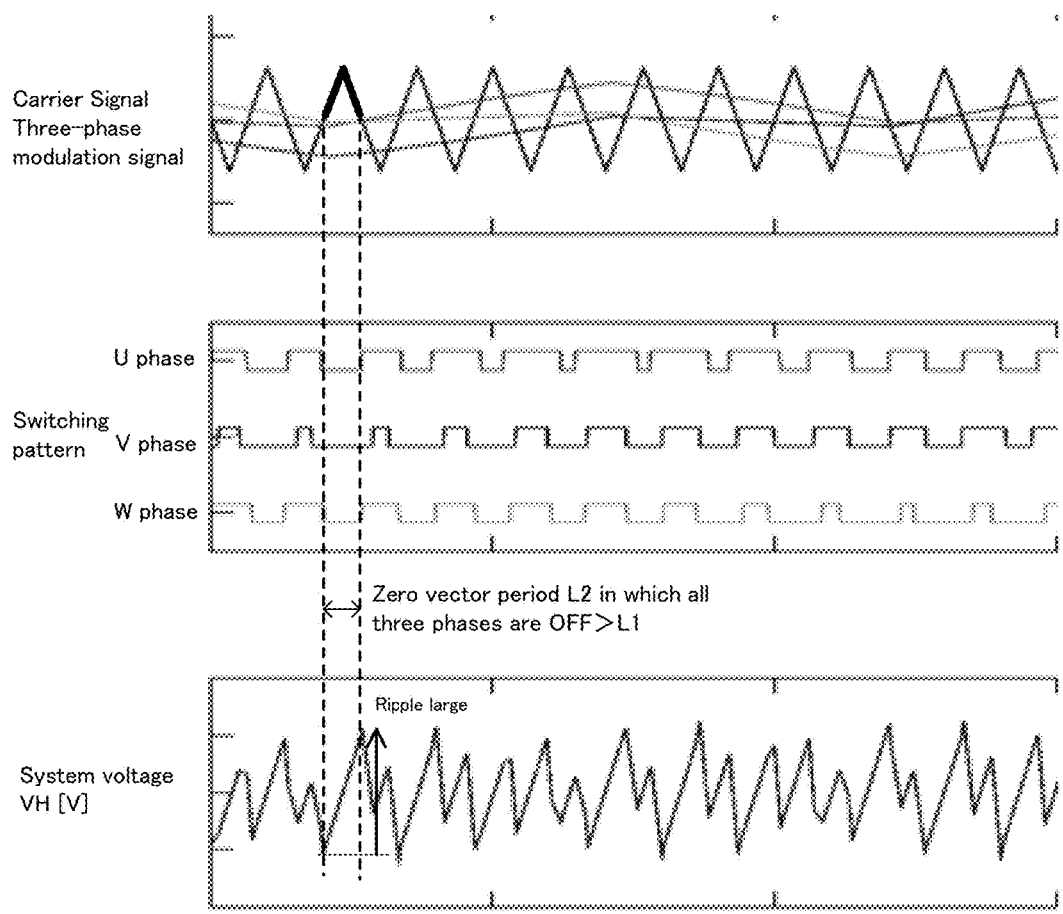
FIG. 7 is a time chart illustrating the various parameters of the inverter after the PWM center correction.
Figure 8:
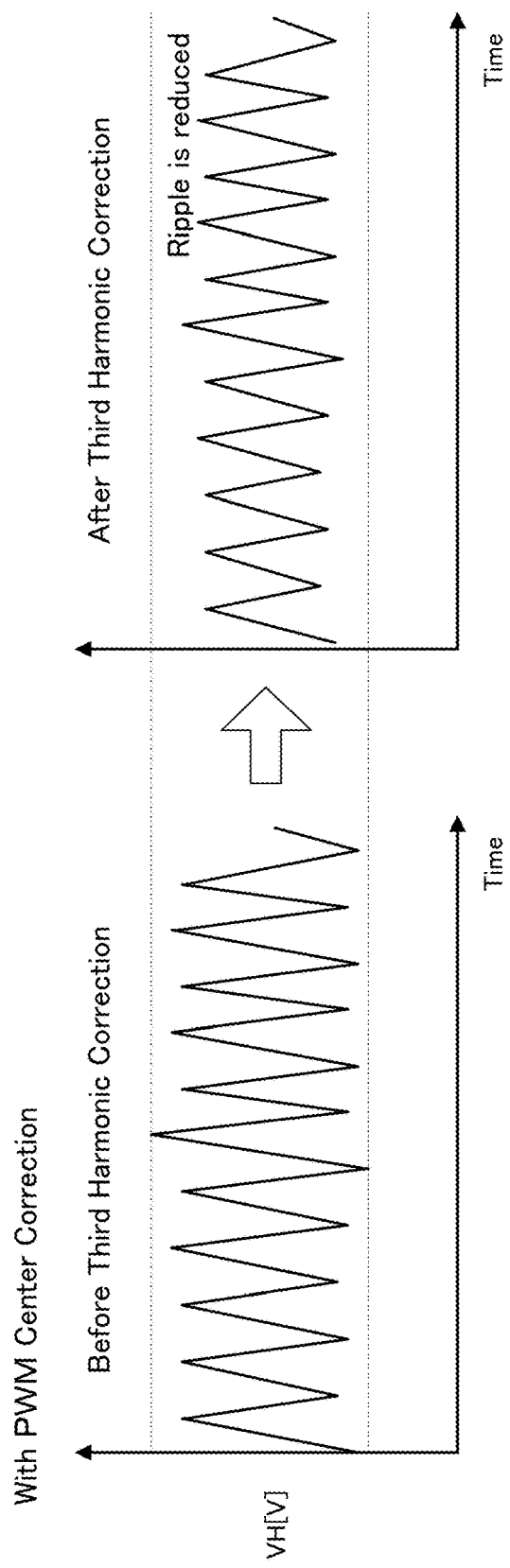
FIG. 8 is a time chart illustrating a ripple reduction effect by the third harmonic correction when the PWM center correction is not performed.
Figure 9:
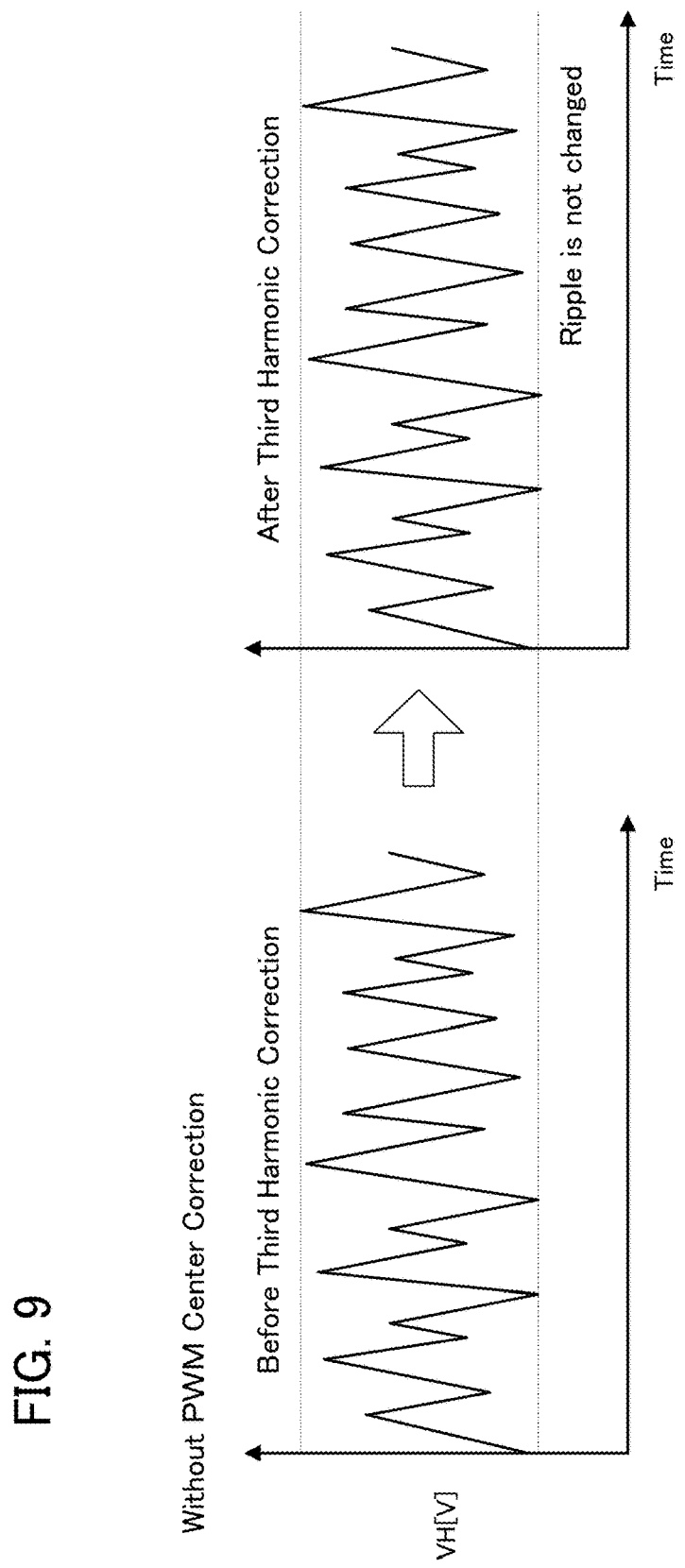
FIG. 9 is a time chart illustrating the ripple reduction effect by the third harmonic correction when the PWM center correction is performed.

Next, with reference to FIG. 5 to FIG. 9, problems that may be caused by the PWM center correction process and the third harmonic correction process will be explained. FIG. 5 is a map illustrating one example of an area in which the PMW center correction and third harmonic correction are performed. FIG. 6 is a time chart illustrating various parameters of the inverter before the PWM center correction. FIG. 7 is a time chart illustrating the various parameters of the inverter after the PWM center correction. FIG. 8 is a time chart illustrating a ripple reduction effect by the third harmonic correction when the PWM center correction is not performed. FIG. 9 is a time chart illustrating the ripple reduction effect by the third harmonic correction when the PWM center correction is performed.

As illustrated in FIG. 5, the PWM center correction process and the third harmonic correction process can be changed by an operating point of the motor generator MG. In the drawing, "PWM" is an area in which the PWM control is performed, and "VPH" is an area in which rectangular wave control is performed. In the area in which the PWM control is performed, an area in which the PWM center correction process is performed (i.e. a PWM center correction area) is an area in which a number of motor revolutions is less than a predetermined number of revolutions. In the area in which the PWM control is performed, an area in which the third harmonic correction process is performed (i.e. a third harmonic correction area) is an area in which the number of motor revolutions is greater than or equal to the predetermined number of revolutions.

The "predetermined number of revolutions" herein is a threshold value for determining whether or not the number of revolutions of the motor generator MG is low enough to cause failure by the heating of each switching element of the inverter 30. In each switching element of the inverter 30, the heating increases as the number of revolutions of the motor generator MG is reduced, and the heating is the largest in zero rotation. Thus, the predetermined number of revolutions can be set in advance by using a relation between the number of revolutions of the motor generator MG and the heating of each switching element.

The present inventors' studies, however, show that a new detrimental effect is caused in the PWM center correction area by changing the correction process on the basis of only the operating point of the motor generator, as described above.

As illustrated in FIG. 6 and FIG. 7, a part in which the carrier signal is larger than the three-phase modulation signals is a zero vector period in which all the three phases (i.e. the U-phase, the V-phase, and the W-phase) of the inverter 30 are off. The zero vector period is extended in comparison with the zero vector period before the correction, when the PWM center of the three-phase modulation signals is reduced by performing the PWM center correction process. This extends a period in which the system voltage VH increases, which accordingly increases a ripple generated in the system voltage VH. In other words, the PWM center correction process has not only an effect of suppressing the heating of the elements, but also a problem of increasing the ripple in the system voltage VH.

As illustrated in FIG. 8 and FIG. 9, when the third harmonic correction process is performed while the PWM center correction process is not performed, the amplitude shift and the phase shift of the third harmonic signal Vh are eliminated, which accordingly reduces the ripple in the system voltage VH. However, even if the third harmonic correction process is performed while the PWM center correction process is performed, the ripple in the system voltage VH cannot be reduced. In other words, the ripple that has increased due to the implementation of the PWM center correction process cannot be reduced by performing the third harmonic correction process.

Therefore, when the PWM center correction process is performed, the ripple in the system voltage VH increases depending on circumstances, and there is a risk that the motor generator MG cannot be normally controlled. In order to solve such a problem, the vehicle control apparatus according to the embodiment is configured to change between the PWM center correction process and the third harmonic correction process and to perform one of the correction processes depending on circumstances, in the PWM center correction area illustrated in FIG. 5.

<Explanation of Operation>

Figure 10:
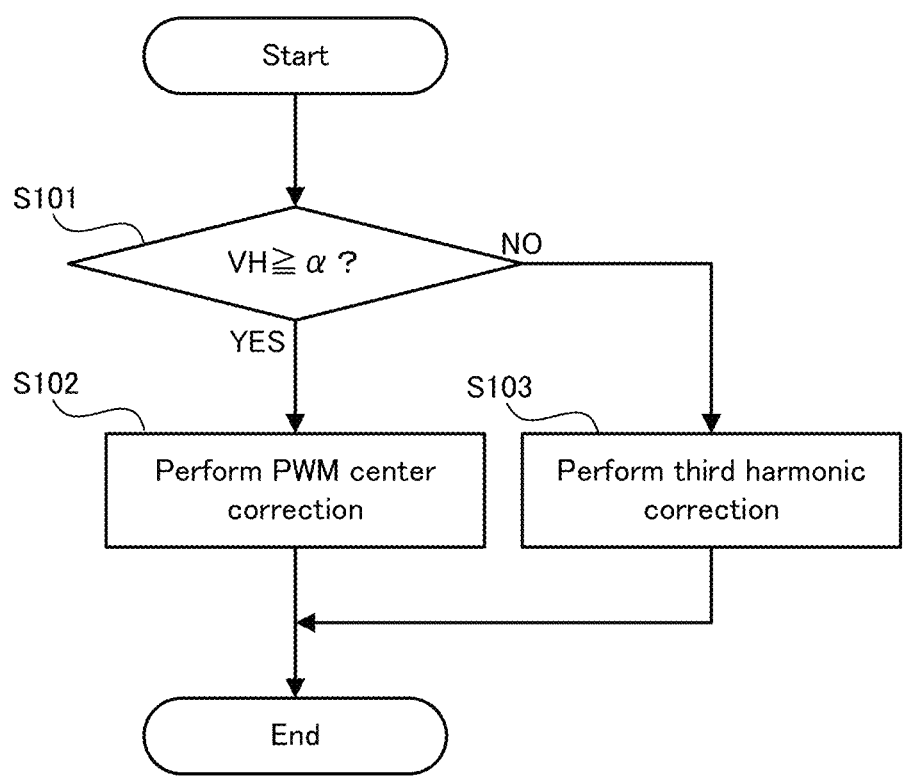
FIG. 10 is a flowchart illustrating a flow of operation of a vehicle control apparatus according to a first embodiment.

Next, with reference to FIG. 10, operation of the vehicle control apparatus according to the embodiment (or the ECU 100) will be explained. FIG. 10 is a flowchart illustrating a flow of the operation of the vehicle control apparatus according to the first embodiment. Hereinafter, out of various processes performed by the ECU 100, a determination process for changing between the PWM center correction process and the third harmonic correction process will be explained in details, and an explanation of the other processes will be omitted.

As illustrated in FIG. 10, in operation of the vehicle control apparatus according to the embodiment, firstly, the correction process determinator 124 determines whether or not a value of the system voltage VH is greater than or equal to a threshold value α (e.g. 450V) (step S101). The threshold value α herein is one specific example of the "first predetermined voltage", and is set in advance to determine whether or not the increase in ripple by the PWM center correction is significant to a non-allowable extent. The ripple caused by the PWM center correction is further reduced as the system voltage VH increases. Thus, the threshold value α can be determined by determining in advance what extent of ripple is allowed.

If it is determined that the system voltage VH is greater than or equal to the threshold value α (the step S101: YES), the correction process determinator 124 instructs the PWM center corrector 122 to perform the PWM center correction process. As a result, the PWM center corrector 122 performs the PWM center correction process (step S102). In this case, the PWM signals are generated on the basis of the modulation signals on which the PWM center correction process is performed.

On the other hand, if it is determined that the system voltage VH is less than the threshold value α (the step S101: NO), the correction process determinator 124 instructs the third harmonic corrector 123 to perform the third harmonic correction. As a result, the third harmonic corrector 123 performs the third harmonic correction (step S103). In this case, the PWM signals are generated on the basis of the modulation signals on which the third harmonic correction process is performed.

As described above, on the vehicle control apparatus according to the embodiment, the correction process for the modulation signals is selected depending on whether or not the system voltage VH is greater than or equal to the threshold value α. A series of process steps may be performed again a predetermined time after the end of the step S102 or the step S103.

<Effect of Embodiment>

Figure 11:
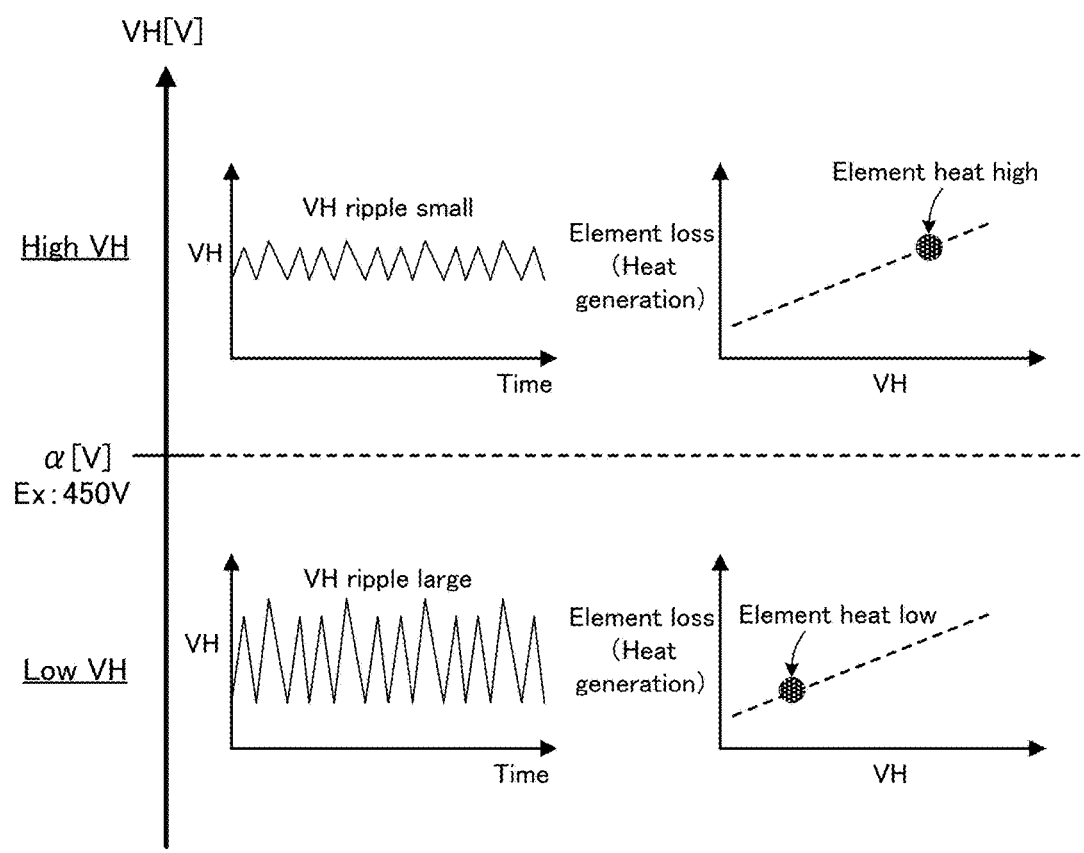
FIG. 11 is a conceptual diagram illustrating a relation among system voltage, a ripple, and element heating.

Next, with reference to FIG. 11, technical effect obtained by the aforementioned operation will be explained in detail. FIG. 11 is a conceptual diagram illustrating a relation among the system voltage VH, the ripple, and the element heating.

As illustrated in FIG. 11, if the system voltage VH is greater than or equal to the threshold value α, the ripple generated in the system voltage VH is relatively small while losses (or heating) of the switching elements of the inverter 30 are relatively high. Thus, by performing the PWM center correction process when the system voltage VH is greater than or equal to the threshold value α, the heating of the switching elements of the inverter 30 can be suppressed, and the failure caused by the heating can be prevented. Moreover, the ripple is hardly generated in the system voltage VH. It is thus possible to sufficiently suppress the generation of the ripple even if the PWM center correction process is performed.

On the other hand, if the system voltage VH is less than the threshold value α, the ripple generated in the system voltage VH is relatively large while the losses of the switching elements of the inverter 30 are relatively low. Thus, by performing the third harmonic correction process when the system voltage VH is less than the threshold value α, the ripple in the system voltage VH is reduced, and the motor generator MG can be accurately controlled. Moreover, the heating of the switching elements is relatively small. There is thus a low possibility of the failure caused by the heating even without performing the PWM center correction process for suppressing the heating.

As described above, if the correction process is selectively used depending on the magnitude of the system voltage VH, the motor generator MG can be driven by making use of respective characteristics of the PWM center correction process and the third harmonic correction process.

Second Embodiment

Figure 12:
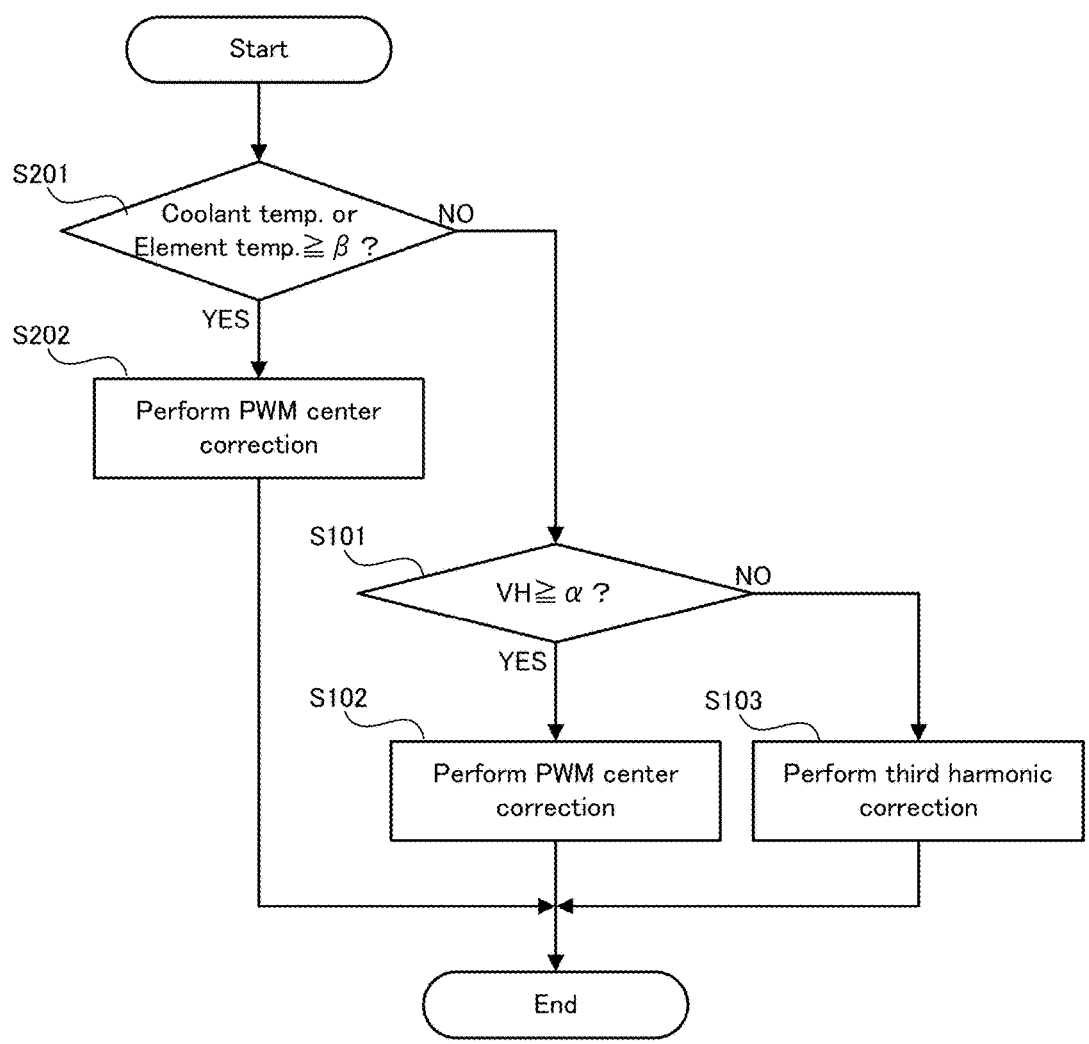
FIG. 12 is a flowchart illustrating a flow of operation of a vehicle control apparatus according to a second embodiment.

Next, a vehicle control apparatus according to a second embodiment will be explained with reference to FIG. 12. FIG. 12 is a flowchart illustrating a flow of operation of the vehicle control apparatus according to the second embodiment.

The second embodiment has partially different operation from that of the first embodiment, and its apparatus configuration and the other operation are substantially the same as those of the first embodiment. Thus, hereinafter, the different part from that of the first embodiment explained above will be explained in detail, and an explanation of the other repetition part will be omitted.

<Explanation of Operation>

As illustrated in FIG. 12, in operation of the vehicle control apparatus according to the second embodiment, firstly, the correction process determinator 124 determines whether or not the temperature of the coolant detected by the coolant temperature sensor S1, or the element temperature of the switching elements detected by the element temperature sensors Sup to Swn is greater than or equal to a threshold value β (e.g. 30 degree C.) (step S201). The threshold value β herein is one specific example of the "first predetermined temperature". The threshold value β is a threshold value for determining whether or not the temperature of each switching element of the inverter 30 is high enough to cause the failure by the heating, and is set in advance in accordance with, for example, heat resistance specification of the element, or the like.

If it is determined that the coolant temperature or the element temperature is greater than or equal to the threshold value β (the step S201: YES), the correction process determinator 124 instructs the PWM center corrector 122 to perform the PWM center correction process. As a result, the PWM center corrector 122 performs the PWM center correction process (step S202). In this case, the PWM signals are generated on the basis of the modulation signals on which the PWM center correction process is performed.

On the other hand, if it is determined that the coolant temperature or the element temperature is less than the threshold value β (the step S201: NO), as in the first embodiment, it is determined whether or not the system voltage VH is greater than or equal to the threshold value α (the step S101), and the PWM center correction process (the step S102) or the third harmonic correction process (the step S103) is selectively performed.

<Effect of Embodiment>

If the coolant temperature or the element temperature is greater than or equal to the threshold value β, there is a possibility of the failure of the switching elements. It is thus preferable to perform the PWM center correction process for suppressing the heating. However, if it is determined only from the system voltage VH as in the first embodiment, the actual temperature of the switching elements is not considered. As a result, even when the heating is to be suppressed, the PWM center correction process is not performed, but the third harmonic correction process is possibly performed.

Thus, in the second embodiment, the actual temperature of the switching elements is estimated from the coolant temperature or the element temperature, and if the coolant temperature or the element temperature is greater than or equal to the threshold value β, the PWM center correction process for suppressing the heating is performed regardless of the system voltage VH. In other words, the PWM center correction process is preferentially performed in accordance with the temperature of the switching elements. It is thus possible to prevent the failure caused by the heating of the switching elements.

Third Embodiment

Figure 13:
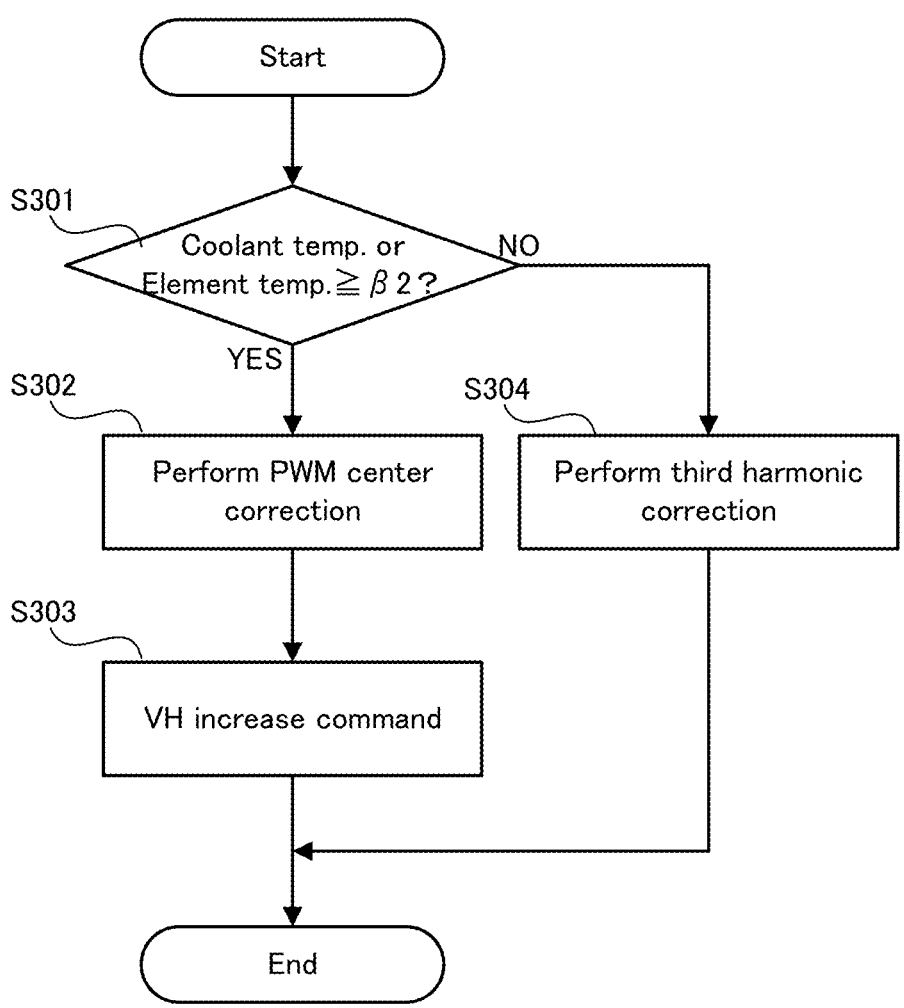
FIG. 13 is a flowchart illustrating a flow of operation of a vehicle control apparatus according to a third embodiment.

Next, a vehicle control apparatus according to a third embodiment will be explained with reference to FIG. 13. FIG. 13 is a flowchart illustrating a flow of operation of the vehicle control apparatus according to the third embodiment.

The third embodiment has partially different operation from those of the first and second embodiments, and its apparatus configuration and the other operation are substantially the same as those of the first and second embodiments. Thus, hereinafter, the different part from those of the first and second embodiments explained above will be explained in detail, and an explanation of the other repetition part will be omitted.

<Explanation of Operation>

As illustrated in FIG. 13, in operation of the vehicle control apparatus according to the third embodiment, firstly, the correction process determinator 124 determines whether or not the temperature of the coolant detected by the coolant temperature sensor S1, or the element temperature of the switching elements detected by the element temperature sensors Sup to Swn is greater than or equal to a threshold value β2 (e.g. 30 degree C.) (step S301). The threshold value β2 herein is one specific example of the "second predetermined temperature". As in the second embodiment, the threshold value β2 is a threshold value for determining whether or not the temperature of each switching element of the inverter 30 is high enough to cause the failure by the heating, and is set in advance in accordance with, for example, heat resistance specification of the element, or the like.

If it is determined that the coolant temperature or the element temperature is greater than or equal to the threshold value β2 (the step S301: YES), the correction process determinator 124 instructs the PWM center corrector 122 to perform the PWM center correction process. As a result, the PWM center corrector 122 performs the PWM center correction process (step S302). In this case, the PWM signals are generated on the basis of the modulation signals on which the PWM center correction process is performed.

Moreover, if the PWM center correction process is performed, a command is outputted to set the system voltage VH at predetermined voltage α2 (e.g. 450V) or more (step S303). Thus, if the system voltage VH is less than the predetermined voltage α2, the system voltage VH is controlled to be greater than the predetermined voltage α2, and if the system voltage VH is greater than the predetermined voltage α2, the system voltage VH is maintained to be higher than the predetermined voltage α2. The predetermined voltage α2 herein is one specific example of the "second predetermined voltage", and is set in advance to determine whether or not the increase in ripple by the PWM center correction is significant to a non-allowable extent, as in the threshold value α in the first embodiment.

On the other hand, if it is determined that the coolant temperature or the element temperature is less than the threshold value 132 (the step S301: NO), the correction process determinator 124 instructs the third harmonic corrector 123 to perform the third harmonic correction. As a result, the third harmonic corrector 123 performs the third harmonic correction (step S304). In this case, the PWM signals are generated on the basis of the modulation signals on which the third harmonic correction process is performed.

<Effect of Embodiment>

If the coolant temperature or the element temperature is greater than or equal to the threshold value β2, there is a possibility of the failure of the switching elements. Thus, in the third embodiment, if the coolant temperature or the element temperature is greater than or equal to the threshold value β2, the PWM center correction process for suppressing the heating is performed. It is thus possible to prevent the failure caused by the heating of the switching elements. On the other hand, if the coolant temperature or the element temperature is less than the threshold value β2, it can be determined that there is a low possibility of the failure of the switching elements. Thus, not the PWM center correction process but the third harmonic correction process is performed. This reduces the ripple in the system voltage VH and makes it possible to accurately control the motor generator MG.

Moreover, in the third embodiment, in contrast to the first and second embodiments, it is not determined whether or not the system voltage VH is greater than or equal to the threshold value α. Thus, there is a possibility that the ripple in the system voltage VH increases due to the implementation of the PWM center correction process. Therefore, when the PWM center correction process is performed, the system voltage VH is controlled to be higher than the predetermined voltage α2, which prevents the increase in ripple caused by the low system voltage VH.

As described above, according to the vehicle control apparatuses in the first to third embodiments, the appropriate correction process is selectively performed in accordance with the system voltage VH, the temperature of the coolant, or the temperature of the switching elements. As a result, it is possible to operate the motor generator MG while preventing the failure caused by the heating of the switching elements.

The above explanation uses an example in which the vehicle 1 is provided with the single motor generator MG. The vehicle 1, however, may be provided with a plurality of motor generators MGs. In this case, the vehicle 1 is preferably provided with the inverters 30, each of which corresponds to respective one of the motor generators MGs. Moreover, in this case, the ECU 100 may independently perform the aforementioned inverter control operation for each inverter 30. Alternatively, the vehicle 1 may be further provided with an engine in addition to the motor generator MG. In other words, the vehicle 1 may be a hybrid vehicle.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A vehicle control apparatus configured to control a vehicle, which includes an alternating current (AC) motor as a power source and an inverter configured to convert direct current (DC) voltage to AC voltage and supply the AC voltage to the AC motor, said vehicle control apparatus comprising:

a modulator configured to generate modulation signals by superimposing a third harmonic signal on voltage command signals for controlling voltage of the inverter;

a first corrector configured to perform a first correction process in which a center value of the modulation signals is corrected to reduce a loss in the inverter;

a second corrector configured to perform a second correction process in which an amplitude shift and a phase shift of the third harmonic signal with respect to the voltage command signals are reduced if a modulation factor of each of the modulation signals is greater than or equal to a predetermined value; and a controller configured (i) to control said first corrector to perform the first correction process if the DC voltage is greater than or equal to first predetermined voltage and (ii) to control said second corrector to perform the second correction process if the DC voltage is less than the first predetermined voltage, when a number of revolutions of the AC motor is less than a predetermined number of revolutions.

2. The vehicle control apparatus according to claim 1, wherein said controller is configured to control the said first corrector to perform the first correction process regardless of whether or not the DC voltage is greater than or equal to the first predetermined voltage, if temperature of coolant of the inverter or temperature of elements included in the inverter is greater than or equal to first predetermined temperature.

3. A vehicle control apparatus configured to control a vehicle, which includes an alternating current (AC) motor as a power source and an inverter configured to convert direct current (DC) voltage to AC voltage and supply the AC voltage to the AC motor, said vehicle control apparatus comprising:
- a modulator configured to generate modulation signals by superimposing a third harmonic signal on voltage command signals for controlling voltage of the inverter;
- a first corrector configured to perform a first correction process in which a center value of the modulation signals is corrected to reduce a loss in the inverter;
- a second corrector configured to perform a second correction process in which an amplitude shift and a phase shift of the third harmonic signal with respect to the voltage command signals are reduced if a modulation factor of each of the modulation signals is greater than or equal to a predetermined value; and
- a controller configured (i) to control said first corrector to perform the first correction process if temperature of coolant of the inverter or temperature of elements included in the inverter is greater than or equal to second predetermined temperature and (ii) to control said second corrector to perform the second correction process if the temperature of the coolant of the inverter or the temperature of the elements included in the inverter is less than the second predetermined temperature, when a number of revolutions of the AC motor is less than a predetermined number of revolutions.

4. The vehicle control apparatus according to claim 3, wherein said controller is configured to control the said first corrector to perform the first correction process while the DC voltage is maintained to be greater than or equal to second predetermined voltage, if the temperature of the coolant of the inverter or the temperature of the elements included in the inverter is greater than or equal to the second predetermined temperature.

\* \* \* \* \*